(12) United States Patent
Ross

(10) Patent No.: US 7,413,210 B1
(45) Date of Patent: Aug. 19, 2008

(54) WATERCRAFT TRAILER SYSTEM

(76) Inventor: Matthew Ross, 29742 Melinda, #634, Rancho Santa Margarita, CA (US) 92688

(*) Notice: Subject to any disclaimer, the term of this patent is extended or adjusted under 35 U.S.C. 154(b) by 8 days.

(21) Appl. No.: 11/527,369

(22) Filed: Sep. 25, 2006

(51) Int. Cl.
 *B60P 3/10* (2006.01)
 *B60P 1/04* (2006.01)
 *B60P 1/34* (2006.01)

(52) U.S. Cl. .................... 280/414.1; 414/482

(58) Field of Classification Search ......... 414/426, 414/429, 474, 482, 483, 484, 485, 486, 533, 414/799, 462; 280/414.1, 413
See application file for complete search history.

(56) References Cited

U.S. PATENT DOCUMENTS

| | | | | |
|---|---|---|---|---|
| 3,902,613 A * | 9/1975 | Newland | ........... | 414/538 |
| 4,109,809 A * | 8/1978 | Clark | ........... | 414/480 |
| 5,016,896 A * | 5/1991 | Shafer | ........... | 280/400 |
| 5,536,131 A | 7/1996 | Behr | ........... | 414/495 |
| 5,603,600 A * | 2/1997 | Egan et al. | ........... | 414/462 |
| 5,645,007 A | 7/1997 | Benton | ........... | 114/263 |
| 5,678,838 A * | 10/1997 | Taylor | ........... | 280/413 |
| 6,155,588 A | 12/2000 | Maxey | ........... | 280/488 |
| 6,217,053 B1 * | 4/2001 | Forsythe et al. | ........... | 280/414.3 |
| 6,428,047 B1 * | 8/2002 | Kaderabek | ........... | 280/789 |

* cited by examiner

*Primary Examiner*—Lesley D. Morris
*Assistant Examiner*—Daniel Yeagley
(74) *Attorney, Agent, or Firm*—Stout, Uxa, Buyan & Mullins, LLP; Linda A. Fox

(57) ABSTRACT

A trailer assembly for transporting recreational vehicles generally includes a base portion having a set of wheels, a holding assembly supported by the base portion and including a first support suitable for holding a first recreational vehicle and a second support adjacent the first support and suitable for holding a second recreational vehicle. The trailer assembly further includes a movement mechanism effective to move the first support and the second support from a launch position to a stow position. The launch position is a position which facilitates launching and loading of recreational vehicles with respect to the trailer assembly and the stow position is a position which is more space-saving than the launch position and facilitates loading of the full trailer assembly into a toy hauler or other limited cargo space.

11 Claims, 2 Drawing Sheets

WATERCRAFT TRAILER SYSTEM

The present invention generally relates to a trailer system and more specifically relates to a personal watercraft trailer system.

BACKGROUND

Personal watercraft continue to gain immerse popularity among water recreation enthusiasts. A personal watercraft (PWC), or sea scooter, is a recreational watercraft which supports a seated or standing rider. PWCs generally include an inboard engine which drives a pump jet that has a screw-shaped impeller which creates thrust for propulsion and steering. These watercraft are often referred by the tradenames WaveRunner, Jet Ski, or Sea-Doo, which are brand names owned by PWC manufacturers Yamaha, Kawasaki, and Bombardier, respectively.

Because of their relatively low cost and freedom and enjoyment they afford to owners, PWC are widely used for recreation. Most PWCs are designed to seat two or three people, though four-passenger models also exist. Stand-up PWCs were the first to see mass production and are still popular for single riders.

PWCs are typically transported from a home to a body of water by means of a simple utility trailer coupled to an automobile, sports utility vehicle or the like. Some utility trailers are specially designed to haul two PWCs in a side by side relationship.

An offshoot of the PWC market has been the development of high end recreational trailers and luxury motorhomes commonly know as "toy haulers". A toy hauler, also known as a sport utility trailer (SUT), "toy box", "gear box", "sport utility RV" (SURV), and "ramp trailer", is a large, sometimes motorized recreational vehicle which combines living quarters with cargo space. The cargo space is usually sufficiently ample for hauling such recreational gear as PWCs, dune buggies, all-terrain vehicles (ATVs), motorcycles, mountain bikes, snowmobiles, kayaks and/or canoes.

In a typical toy hauler, a front portion thereof provides comfortable living quarters, which may be similar to the living quarters found in a conventional motorhome, and a rear portion thereof provides cargo space for containing the recreational gear. A ramp is provided at the back end of the toy hauler to facilitate loading of recreational gear into the cargo space.

Unfortunately, it is quite cumbersome to load a pair of conventional PWCs into the rear portion of a toy hauler in a side-by-side relationship. Although many older model PWCs can be somewhat narrow in width, many of the relatively later model PWCs are heavier, bulkier and generally wider than their progenitors. A typical toy hauler rear portion has a useable cargo space having a width of only about 93 inches, making it difficult to contain a pair of side-by-side PWCs mounted on a smaller trailer which commonly have a collective width of up to about 102 inches.

More convenient, easier to use systems for loading, launching, transporting and/or storing these watercraft and other recreational vehicles are needed.

SUMMARY OF THE INVENTION

Accordingly, a trailer assembly is provided which is advantageously designed to enable recreational vehicles, for example, a plurality of personal watercraft, (PWCs) such as Bombadier SeaDoo, Yamaha Waverunner, Kawasaki Jet Ski and the like, to be easily loaded into a limited cargo space, for example, the back portion of a toy hauler, a garage or other storage space.

In a broad aspect of the invention, the trailer assembly includes a base portion structured to be coupled to a set of wheels, and a holding assembly coupled to the base portion and structured to enable holding of two PWCs in a first position and in second position different from the first position. Further, the trailer assembly includes a mechanism for enabling and/or facilitating moving of the PWCs between the first position and the second position while the PWCs are being supported by the holding assembly For example, the holding assembly is movable between a first position in which the PWCs are supported in a substantially level, side-by-side relationship on the base portion, and a second position which the PWCs are supported in a more space-efficient manner, for example, in a tiered, staggered, tilted or other position different from the first position.

When disposed in the first position on the base portion, the holding assembly enables the PWCs to be easily towed, for instance, along a highway, and allows the PWCs to be easily unloaded or launched into a body of water such as a lake, stream or harbor. When disposed in the second position on the base portion, the holding assembly holds or supports the PWCs in a relatively more space efficient manner, for example, in a manner that facilitates storage of the PWCs, for example, in the back of a toy hauler, garage or other limited cargo space.

Although the present application primarily describes an embodiment of the invention that is designed for transport and storage of two PWCs, it should be appreciated that the present trailer assembly, with appropriate modification thereto, can be used for transporting and storing more than two PWCs and/or other types of recreational vehicles, for example, recreational vehicles that are conventionally transported in a generally side-by-side relationship on a trailer. Such modifications are considered to be within the scope of the present invention.

In a specific embodiment, the present trailer assembly generally comprises a wheeled base portion including a tow bar or other structure enabling the trailer assembly to be pulled or towed, for example, by a motor vehicle, and a holding assembly, supported by the base portion and structured to hold and support at least one recreational vehicle. More specifically, the holding assembly comprises a first support suitable for holding a first recreational vehicle, for example a first PWC, and a second support suitable for holding a second recreational vehicle for example a second PWC, in such a manner so that the PWCs can be transported by the trailer assembly along a highway. In this regard, it should be appreciated that the present trailer assemblies are preferably designed to be suitable for transportation along public highways and roadways and include features for meeting federal and state vehicle regulations as necessary or desirable.

The present trailer assemblies further comprises a movement mechanism which is effective to move and/or facilitate movement of at least one of the first support and the second support, for example, while the first support and the second support are holding or supporting a first PWC and a second PWC respectively. In some embodiments, the movement mechanism may be effective to move the first support toward the second support while the second support remains stationary with respect to the base portion. In other embodiments, the movement mechanism may be effective to move both the first and the second supports toward one another, for example, in a substantially simultaneous motion.

More specifically, the movement mechanism is effective to enable the first and second supports to be moved between a first position, herein sometimes referred to as a launch position, and a relatively more compact second position, herein sometimes referred to as a stow position. For example, when disposed in the launch position, the first support and the second support define a first effective width, and when disposed in the stow position the first support and the second support define a second effective width that is less than the first effective width.

Preferably, while the holding assembly is in the launch position, the first support and the second support are situated and effective to hold and support first and second PWCs in a generally level, generally side-by-side relationship. In other words, when in the launch position, the PWCs held and supported by the holding assembly are substantially level with each other and are substantially equally elevated above the base portion.

While the holding assembly is in the stow position, at least one of the first support and the second support may be disposed at an angle to the base portion. For example, both of the first support and the second support may be angled with respect to the base portion. For example, when the holding assembly is disposed in the stow position, each of the first and second PWCs supported thereby is tilted about its longitudinal axis at an angle of about 15 degrees or more. Further, when the holding assembly is disposed in the stow position, the first support and the second support may be elevated at different heights above the base portion. For example, the first support may be higher than the second support with respect to the base portion such that the first PWC is higher than the second PWC. The difference in elevation between the first and second supports when in the stow position may be up to about 6 inches, or up to about 10 inches, or greater.

At least one of the first support and the second support may be pivotally mounted to the base portion to enable to movement between the launch and stow positions. More specifically, the movement mechanism may comprise a set of cooperatively joined arms coupled, for example, pivotally coupled, to the base portion. Preferably, the movement mechanism is structured to enable the holding assembly to be moved between the launch position and the stow position by an ordinary adult human, for example, while the PWCs are being supported by the holding assembly. For example, the movement mechanism may further comprise a jack, for example, a screw jack, or other suitable actuating mechanism for facilitating movement of the arms by a single adult individual. Even more preferably, the movement mechanism may be effective to move both the first support and the second support substantially simultaneously such that the PWCs can be moved between the launch position and the stow position by actuating a single jack other suitable actuating mechanism.

In another aspect of the invention, while the movement mechanism is being actuated to move the first and second supports between the launch position and the stow position, the PWCs are rotated about their longitudinal axes, and the PWCs are pulled toward each other so that the collective width of the PWCs is reduced. For example, when the holding assembly is disposed in the launch position, the trailer assembly/PWC combination defines a first collective width, and when the holding assembly is disposed in the stow position, the trailer assembly/PWC combination defines a second collective width that is less than the first collective width. The difference between the first collective width and the second collective width may be about 5 inches, about 10 inches, about 15 inches, or greater. This will often depend on the size of the PWCs being held on the trailer assembly. Typically, the second collective width is sufficiently narrow so as to facilitate entry of the trailer assembly/PWC combination though a relatively narrow space, for example, through an ordinary toy hauler cargo door opening.

When the holding assembly is disposed in the launch position, the trailer assembly may have width and height dimensions similar or identical to a typical, conventional PWC trailer. The launch position allows normal PWC launching and recovery at the water. When the PWCs are ready to be loaded into a toy hauler, the movement mechanism can be actuated to cause the PWCs to be tilted, lifted, and/or pulled towards each other, and the trailer assembly is backed up a ramp, for example, by being pushed by a tow vehicle, into the toy hauler cargo space. The trailer assembly can then be detached from the tow vehicle and secured in the toy hauler cargo space. When ready to be removed from the toy hauler, the trailer assembly is attached to the tow vehicle and pulled down the ramp. The PWCs are rotated or pushed away from each other, leveled out (to achieve the launch position), and are then ready for entry into the water.

In another aspect of the invention, the holding assembly may be considered to be movable between an expanded configuration in which the first and second supports are positioned to support a first and second watercraft in an generally level, side-by-side relationship, and a collapsed configuration in which the first and second supports are positioned to support a first and second watercraft respectively in an angled configuration for facilitating storage of the watercraft.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description and drawings.

BRIEF DESCRIPTION OF THE DRAWINGS

The present invention may be more clearly understood, and the aspects and advantages thereof better appreciated, with reference to the following detailed description of and accompanying drawings of which.

DETAILED DESCRIPTION

Figure 1:
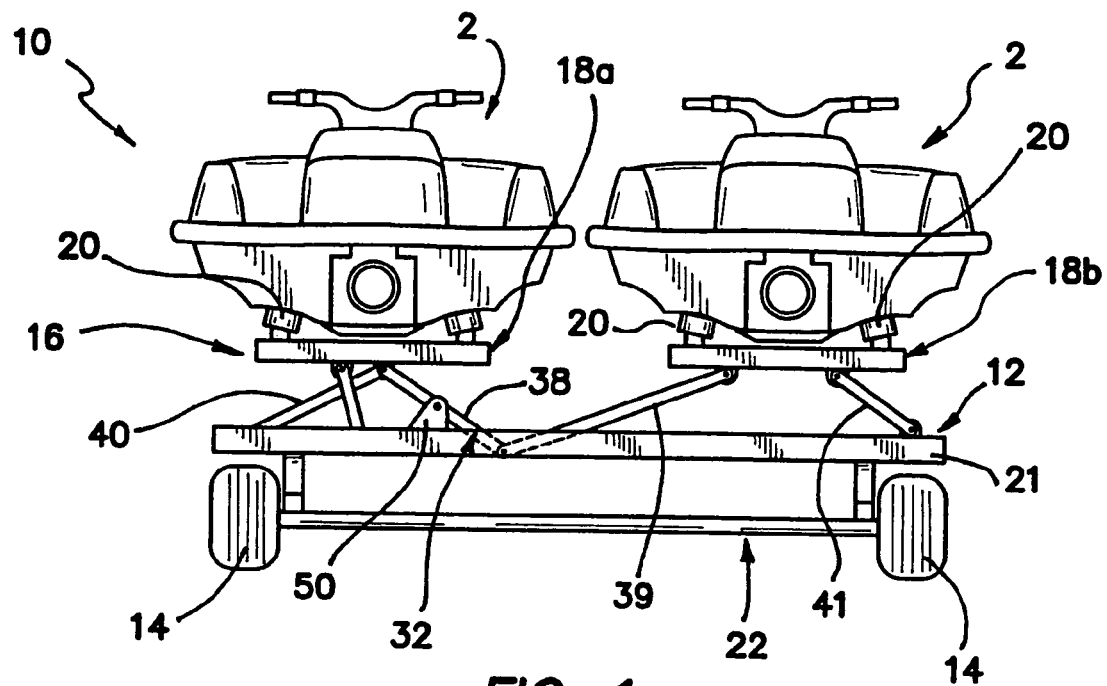
FIG. 1 is a rear elevation view of a trailer assembly in accordance with the invention, the trailer assembly including a holding assembly disposed in a launch position supporting a first PWC and a second PWC in a side-by-side, substantially level relationship.
Figure 2:
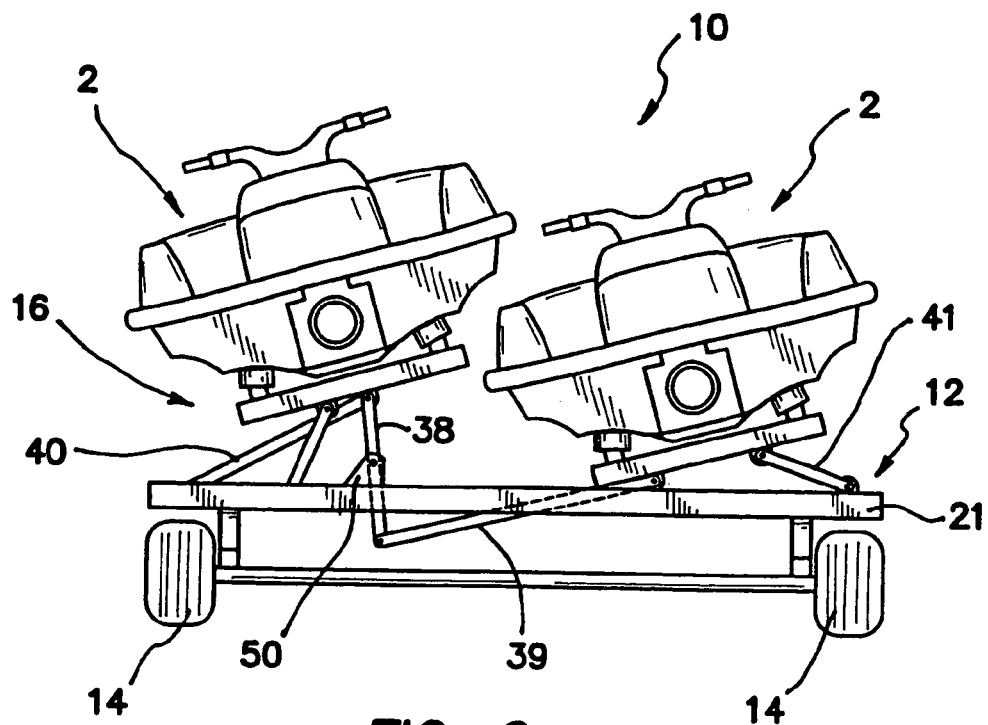
FIG. 2 is a back view of the trailer assembly shown in FIG. 1, the holding assembly disposed in a stow position for facilitating transport and/or storage of the PWCs.

Turning now to FIG. 1, a rear view of a trailer assembly in accordance with the invention is shown generally at 10. The present trailer assembly 10 is advantageously structured to effectively enable a person, for example, an ordinary adult human being, to quickly and easily move a pair of Personal Watercraft 2 (PWCs), or other type of recreational vehicle mounted on the trailer assembly 10, such that once moved, for example to a position such as shown in FIG. 2, the effective width of the combination trailer assembly/PWC is significantly reduced. This reduction in width is sufficient to allow the trailer assembly/PWC combination to be loaded into a relatively smaller space than is allowable with conventional trailer assemblies.

Figure 3:
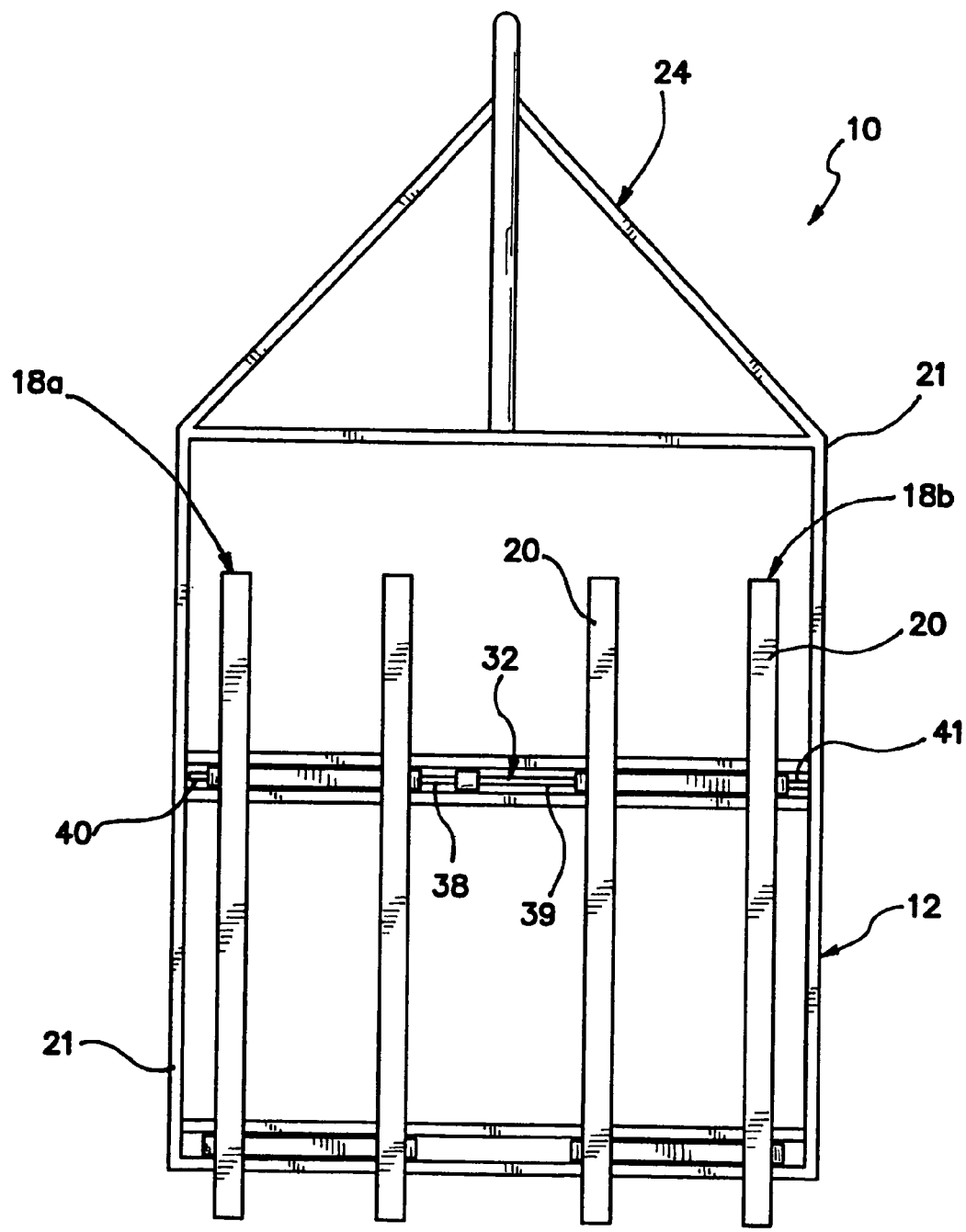
FIG. 3 is a top view of the trailer assembly shown in FIG. 1, with the PWCs removed for the sake of clarity.

In the shown embodiment, the assembly 10 generally comprises a base portion 12 coupled to or structured to be couplable to a set of wheels 14; a holding assembly 16 supported by the base portion 12 and including a first support 18a suitable for holding a first recreational vehicle 2 and a second support 18b adjacent the first support 18a and suitable for holding a second recreational vehicle 2. For example, each of the first and second supports 18a and 18b generally includes two spaced apart longitudinal elements 20, for example, padded longitudinal elements, for providing support to a PWC in a generally upright position. The base portion 12 may comprise a frame 21 and an axle assembly 22 coupling the wheels 14, and a tow bar assembly 24 (shown in FIG. 3) for coupling the trailer assembly 10 to a motor vehicle, (not shown) such as an automobile, a sports utility vehicle or other motor vehicle that is effective to tow a conventional utility trailer.

The assembly 10 further comprises a movement mechanism 32, operably coupled to at least one of the first support 18a and the second support 18b; that is structured and/or effective to move the holding assembly 16 from a first position, such as shown in FIG. 1, to a second, relatively narrower position, such as shown in FIG. 2.

In the shown embodiment, when the holding assembly 16 is in the first position, the vehicles 2 supported thereby are generally level with one another and are disposed in a side-by-side arrangement shown in FIG. 1. This position, sometimes herein referred to as a "launch position", allows the vehicles, for example, PWCs, to be loaded onto the longitudinal elements 20 using conventional methods and techniques. When in the launch position, the vehicles 2 can be unloaded or launched directly into a body of water, for example, by sliding the vehicles off of the longitudinal elements 20 from the rear of the trailer assembly 10. The launch position may be similar to or identical to a traditional or conventional position of which such PWCs are located on conventional utility trailers made for transporting same.

Turning now to FIG. 2, when the holding assembly 16 is disposed in the second position, sometimes herein referred to as a "stow position", the vehicles 2 are closer together and preferably do not extend beyond the base portion frame 21. Generally, the stow position reduces the effective width of the trailer assembly/PWC combination relative to the launch position shown in FIG. 1. It can be appreciated from FIG. 2 that when the holding assembly 16 is disposed in the stow position, the first and second supports 18a and 18b, are located to be effective in supporting a first PWC 2 and a second PWC 2, respectively, in a tiered relationship.

For a typical trailer carrying a pair of late model PWCs, the effective width of the trailer/PWC combination, measured between the outermost edges of the PWCs, is about 102". A typical cargo space opening of a toy hauler is about 94" to about 95". The present invention makes it possible to pull a trailer having PWCs mounted thereto, into the cargo space opening of a toy hauler. In some embodiments of the invention, the tow bar 24 of the base portion 22 may be pivotal, for example, upwardly pivotal with respect to frame 21 to reduce the effective length of the trailer assembly 10 as well.

Advantageously, the mechanism 32 is structured to enable the movement of the holding assembly 16 from the first position to the second position while the first and second supports 18a and 18b are supporting or holding the recreational vehicles 2.

In the shown embodiment, the mechanism 32 is effective to move both of the first support 18a and the second support and 18b, relative to the base portion 12. For example, when the holding assembly 16 is moved from the first position shown in FIG. 1, to the second position such as shown in FIG. 2, the first support 18a is pivoted upwardly, and the second support 18b is also substantially simultaneously pivoted inwardly toward the center of the base portion 12.

There are many ways this can be accomplished. The mechanism 32 may comprise a set of cooperative movable elements. More specifically, in the shown embodiment, the mechanism includes cooperatively joined first inner arm 38, second inner arm 39, first outer arm 40, and second outer arm 41. When first inner arm 38 is pivoted about coupler 50, first support 18a is lifted and tilted and second support 18b is lowered and tilted, as shown. By moving movable element 36a such as shown in the Figures, first support 18a is lifted upwardly and inwardly and second support 18b is moved downwardly and inwardly.

The movement mechanism 32 may include a manually operable or motorized screw jack or other suitable manual or motorized actuator operatively couplable to the movable elements 36 and effective to initiate or cause movement of the holding assembly 16 between the first position and the second position. Once disposed in the stow position, means such as latches, locks, brakes or the like may be utilized for locking or latching the holding assembly in place, for example, in order to prevent shifting of the first and second supports.

In yet other embodiments of the invention, the movement mechanism comprises individually operable movement mechanisms for separately moving the first and second supports from the first position to the second position, or from the launch position to the stow position.

The components of the trailer assembly 10 preferably comprise suitable rust and corrosive resistant materials, for example, marine grade aluminum, stainless steel and/or the like. In embodiments of the invention where the actuating mechanism includes motorized components, such components are preferably enclosed in water tight compartments as necessary to maintain long life and functional integrity thereof.

While this invention has been described with respect to various specific examples and embodiments, it is to be understood that the invention is not limited thereto and that it can be variously practiced within the scope of the following claims.

What is claimed is:

1. A trailer assembly for transporting recreational vehicles, the assembly comprising
a base portion structured to be couplable to a set of wheels;
a holding assembly supported by the base portion and including a first support suitable for holding a first recreational vehicle and a second support adjacent the first support and suitable for holding a second recreational vehicle; and
a movement mechanism, operably coupled to at least one of the first support and the second support; effective to move the first support toward the second support while the first support and the second support are holding a first recreational vehicle and a second recreational vehicle respectively.

2. The assembly of claim 1 wherein the movement mechanism is effective to move both of the first support and the second support with respect to the base portion.

3. The assembly of claim 1 wherein the first support and the second support are structured to support a first personal watercraft and a second personal watercraft respectively.

4. The assembly of claim 1 wherein the movement mechanism is effective to rotate at least one of the first support and the second support, the rotation being effective to cause rotation of a recreational vehicle held by the at least one of the first support and the second support.

5. The assembly of claim 1 wherein the holding assembly is structured to be moveable between a first position in which the first and second supports are disposed in a level, generally side-by-side relationship and a second position that is different from the first position.

6. The assembly of claim 5 wherein the holding assembly is structured such that when disposed in the second position, the first support and the second support are tilted with respect to the base portion.

7. The assembly of claim 5 wherein the holding assembly is structured such that when disposed in the second position, the first support is elevated with respect to the second support.

8. The assembly of claim 1 wherein the holding assembly is structured to be moveable between a first position in which the first and second supports are located to be effective in supporting a first recreational vehicle and a second recreational vehicle, respectively, in a level, generally side-by-side relationship, and a second position that is different from the first position.

9. The assembly of claim 1 wherein the holding assembly is structured to be moveable between a first position in which the first and second supports are located to be effective in supporting a first recreational vehicle and a second recreational vehicle, respectively, in a generally side-by-side relationship, and a second position in which the first and second supports are located to be effective in supporting a first recreational vehicle and a second recreational vehicle, respectively, in a tiered relationship.

10. The assembly of claim 1 wherein the holding assembly is structured to be moveable between a launch position in which the first support and the second support define a first effective width, and a stow position in which the first support and the second support define a second effective width that is less than the first effective width.

11. A trailer assembly comprising:
a base portion structured to be couplable to a set of wheels and including a tow portion for securing the trailer assembly to a motorized vehicle;
a holding assembly supported by the base portion and including a first support and a second support suitable for holding a first recreational vehicle and a second recreational vehicle respectively; and
a movement mechanism, operably coupled to at least one of the first support and the second support; effective to move the holding assembly between an launch position and a stow position,
wherein when the holding assembly is in the launch position, the first and second supports are positioned to support a first and second watercraft in an generally level side-by-side relationship having a first effective width, and when the holding assembly is in the stow position, the first and second supports are positioned to support a first and second watercraft respectively in a position having a second effective width that is reduced relative to the first effective width.

* * * * *